(12) United States Patent
Brandt et al.

(10) Patent No.: US 7,065,038 B1
(45) Date of Patent: Jun. 20, 2006

(54) AUTOMATIC PROTECTION SWITCHING LINE CARD REDUNDANCY WITHIN AN INTERMEDIATE NETWORK NODE

(75) Inventors: William P. Brandt, Groton, MA (US); Guy C. Fedorkow, Bedford, MA (US); Gary S. Muntz, Lexington, MA (US)

(73) Assignee: Cisco Technology, Inc., San Jose, CA (US)

( * ) Notice: Subject to any disclaimer, the term of this patent is extended or adjusted under 35 U.S.C. 154(b) by 897 days.

(21) Appl. No.: 09/796,047

(22) Filed: Feb. 28, 2001

(51) Int. Cl.
*H04J 1/16* (2006.01)
*H04M 3/00* (2006.01)

(52) U.S. Cl. .............. 370/219; 370/356; 370/400; 379/279

(58) Field of Classification Search ........ 370/216–228, 370/244, 245, 248–249, 352–356, 400–403, 370/412, 420; 379/271–279
See application file for complete search history.

(56) References Cited

U.S. PATENT DOCUMENTS

| | | | | |
|---|---|---|---|---|
| 5,229,990 | A | * | 7/1993 | Teraslinna .................. 370/218 |
| 5,349,579 | A | * | 9/1994 | Madonna et al. ........... 370/259 |
| 5,596,569 | A | * | 1/1997 | Madonna et al. ........... 370/217 |
| 5,751,710 | A | | 5/1998 | Crowther et al. |
| 5,903,544 | A | * | 5/1999 | Sakamoto et al. .......... 370/218 |
| 6,005,841 | A | * | 12/1999 | Kicklighter ................. 370/217 |
| 6,075,767 | A | * | 6/2000 | Sakamoto et al. .......... 370/228 |
| 6,272,151 | B1 | | 8/2001 | Gupta et al. |
| 6,324,185 | B1 | | 11/2001 | Budhraja |
| 6,359,858 | B1 | * | 3/2002 | Smith et al. ................. 370/217 |
| 6,636,478 | B1 | * | 10/2003 | Sensel et al. ................ 370/216 |
| 6,876,660 | B1 | * | 4/2005 | Hughes et al. ............ 370/395.4 |
| 6,879,559 | B1 | * | 4/2005 | Blackmon et al. .......... 370/225 |

OTHER PUBLICATIONS

U.S. Appl. No. 09/796,046, filed Feb. 28, 2001, G. Muntz.
Synchronous Optical Network (SONET) Transport Systems: Common Generic Criteria; GR-253-CORE, pp. 5-16-5-20, Issue 2, Dec. 1995 with Revision 2, Jan. 1999.
U.S. Appl. No. 09/791,063, filed Feb. 22, 2001, Rachepalli et al.
U.S. Appl. No. 09/791,062, filed Feb. 22, 2001, Muntz.

* cited by examiner

*Primary Examiner*—Chi Pham
*Assistant Examiner*—Melanie Jagannathan
(74) *Attorney, Agent, or Firm*—Cesari and McKenna LLP (57) ABSTRACT

An apparatus and technique configures an intermediate network node, such as an aggregation router, to implement automatic protection switching (APS) redundancy among its line cards in the event of a failure to one of those cards. The APS line card redundancy provides redundancy among a pair of line cards connected to a performance routing engine of the router. Internal APS data paths are implemented in the router through the provision of an alias logic circuit that selects packet data from one of an adjacent pair of line cards and sends identical copies of data to that adjacent pair of line cards.

45 Claims, 8 Drawing Sheets

AUTOMATIC PROTECTION SWITCHING LINE CARD REDUNDANCY WITHIN AN INTERMEDIATE NETWORK NODE

CROSS-REFERENCE TO RELATED APPLICATIONS

The present invention is related to the following co-pending and commonly assigned U.S. patent application Ser. No. 09/796,046 titled, Multi-Port Line Card Redundancy Technique for an Intermediate Network Node, which was filed on even date herewith and which application is hereby incorporated by reference as though fully set forth herein.

FIELD OF THE INVENTION

The present invention relates to communication networks, and in particular, to redundancy within an intermediate node of a communications network, such as a computer network.

BACKGROUND OF THE INVENTION

A computer network is a geographically distributed collection of interconnected communication links and segments for transporting data between nodes, such as computers. Many types of network segments are available, with the types ranging from local is area networks (LAN) to wide area networks (WAN). For example, the LAN may typically connect personal computers and workstations over dedicated, private communications links, whereas the WAN may connect large numbers of nodes over long-distance communications links, such as common carrier telephone lines. The Internet is an example of a WAN that connects disparate networks throughout the world, providing global communication between nodes on various networks. The nodes typically communicate over the network by exchanging discrete frames or packets of data according to predefined protocols. In this context, a protocol consists of a set of rules defining how the nodes interact with each other.

Computer networks may be further interconnected by an intermediate node, such as a router or switch, having a plurality of ports that may be coupled to the networks. To interconnect dispersed computer networks and/or provide Internet connectivity, many organizations rely on the infrastructure and facilities of Internet Service Providers (ISPs). ISPs typically own one or more backbone networks that are configured to provide high-speed connection to the Internet. To interconnect private networks that are geographically diverse, an organization may subscribe to one or more ISPs and couple each of its private networks to the ISPs equipment. Here, the router may be utilized to interconnect a plurality of private networks or subscribers to an IP "backbone" network. Routers typically operate at the network layer of a communications protocol stack, such as the internetwork layer of the Transmission Control Protocol/Internet Protocol (TCP/IP) communications architecture.

Simple networks may be constructed using general-purpose routers interconnected by links owned or leased by ISPs. As networks become more complex with greater numbers of elements, additional structure may be required. In a complex network, structure can be imposed on routers by assigning specific jobs to particular routers. A common approach for ISP networks is to divide assignments among access routers and backbone routers. An access router provides individual subscribers access to the network by way of large numbers of relatively low-speed ports connected to the subscribers. Backbone routers, on the other hand, provide transports to Internet backbones and are configured to provide high forwarding rates on fast interfaces. ISPs may impose further physical structure on their networks by organizing them into points of presence (POP). An ISP network usually consists of a number of POPs, each of which comprises a physical location wherein a set of access and backbone routers is located.

As Internet traffic increases, the demand for access routers to handle increased density and backbone routers to handle greater throughput becomes more important. In this context, increased density denotes a greater number of subscriber ports that can be terminated on a single router. Such requirements can be met most efficiently with platforms designed for specific applications. An example of such a specifically designed platform is an aggregation router. The aggregation router, or "aggregator", is an access router configured to provide high quality of service (QoS) and guaranteed bandwidth for both data and voice traffic destined for the Internet. The aggregator also provides a high degree of security for such traffic. These functions are considered "high-touch" features that necessitate substantial processing of the traffic by the router.

More notably, the aggregator is configured to accommodate increased density by aggregating a large number of leased lines from ISP subscribers onto a few trunk lines coupled to an Internet backbone. Increased density has a number of advantages for an ISP, including conservation of floor space, simplified network management and improved statistical performance of the network. Real estate (i.e., floor space) in a POP is typically expensive and costs associated with floor space may be lowered by reducing the number of racks needed to terminate a large number of subscriber connections. Network management may be simplified by deploying a smaller number of larger routers. Moreover, larger numbers of interfaces on the access router improve the statistical performance of a network. Packet networks are usually designed to take advantage of statistical multiplexing, capitalizing on the fact that not all links are busy all of the time. The use of larger numbers of interfaces reduces the chances that a "fluke" burst of traffic from many sources at once will cause temporary network congestion.

In addition to deployment at a POP, the aggregator may be deployed in a telephone company central office. The large numbers of subscribers connected to input interface ports of the aggregator are typically small to medium sized businesses that conduct a substantial portion of their operations "on-line", e.g., over the Internet. Each of these subscribers may connect to the aggregator over a high reliability link connection that is typically leased from, e.g., a telephone company provider. The subscriber traffic received at the input interfaces is funneled onto at least one output trunk interface. That is, the aggregator essentially functions as a large "fan-in" device wherein a plurality (e.g., thousands) of relatively low-speed subscriber input links is aggregated onto a single, high-speed output trunk to a backbone network of the Internet.

Redundancy techniques are used to protect against failures within an intermediate node such as an aggregation router. Here, the failures may be directed to an input and/or output interface of the router or to the link connection (such as a fiber optic cable) coupled to the aggregator. Failures to one or more of these components typically require human intervention to replace the failed component and then reconfigure the router for proper operation. Such human intervention is inefficient and costly, and the present invention is directed a technique for automatically (i.e., without human intervention) reconfiguring an aggregator upon detection of a failure to a component of the router.

SUMMARY OF THE INVENTION

The present invention comprises an apparatus and technique for configuring an intermediate network node, such as an aggregation router, to implement automatic protection switching (APS) redundancy among its line cards in the event of a failure to one of those cards. The APS line card redundancy provides redundancy among a pair of line cards connected to a performance routing engine (PRE) of the router. Specifically, internal APS data paths are implemented in the PRE through the provision of a novel alias logic circuit that selects packet data from one of an adjacent pair of line cards and sends identical copies of data to that adjacent pair of line cards.

In the illustrative embodiment, the aggregation router includes a backplane having a plurality of slots, each of which is configured to accommodate a full-size line card or two half-sized line cards. As a result, the present invention provides at least two modes for APS line card redundancy configuration: full slot APS and half slot APS. The full slot APS mode binds two adjacent full sized line cards into a redundant pair, whereas the half slot APS mode combines a top and bottom subslot of a slot to form one redundant interface with respect to the router. In the latter mode, the alias logic circuit is configured to send the same packet data to both the top and bottom subslots, while also selecting one of the two subslots to use for receive data.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

Figure 1:
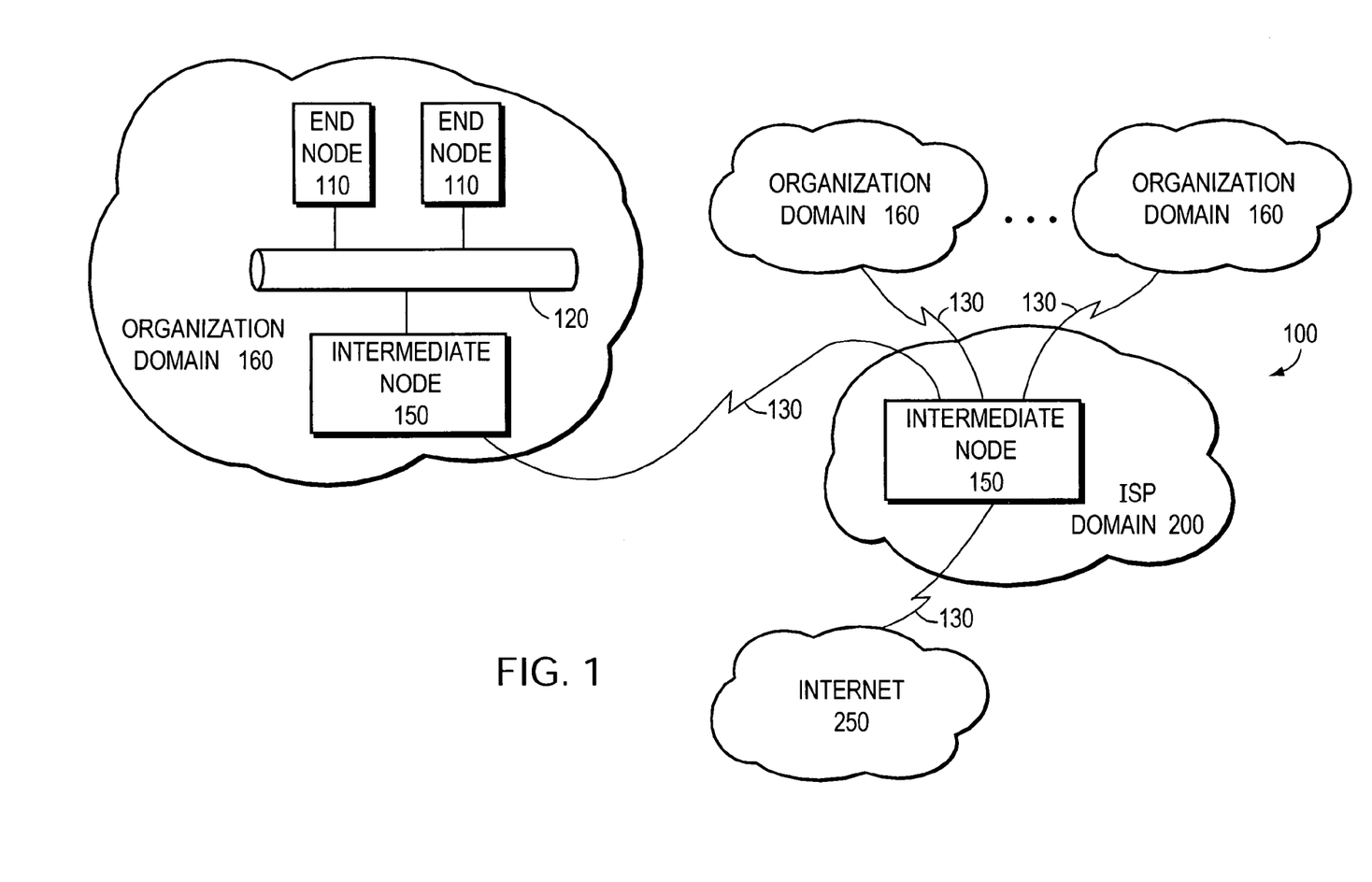
FIG. 1 is a schematic block diagram of a network including a collection of communication links and segments organized into a plurality of subscriber domains coupled to an Internet service provider (ISP) domain.

FIG. 1 is a schematic block diagram of a computer network 100 comprising a collection of communication links and segments connected to a plurality of nodes, such as end nodes 110 and intermediate nodes 150. The network links and segments may comprise local area networks (LANs) 120 and wide area network (WAN) links 130 interconnected by intermediate nodes 150, such as network switches or routers, to form an internetwork of computer nodes. These internetworked nodes communicate by exchanging data packets according to a predefined set of protocols, such as the Transmission Control Protocol/Internet Protocol (TCP/IP). It should be noted that other techniques/protocols, such as the Hypertext Transfer Protocol (HTTP), may be advantageously used with the present invention.

Figure 2:
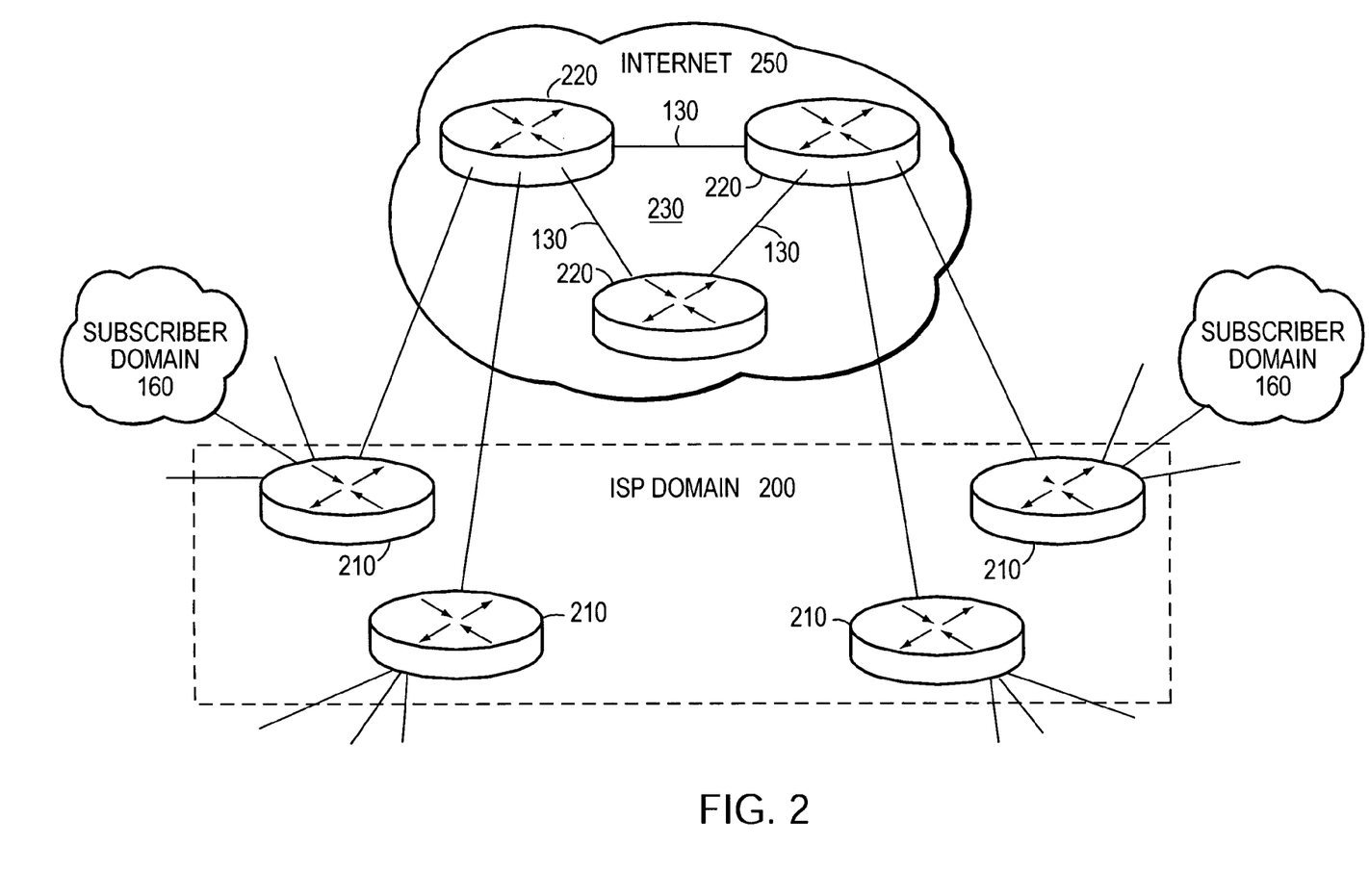
FIG. 2 is a schematic block diagram of an ISP domain comprising a plurality of interconnected access and backbone routers.

To interconnect their dispersed private computer networks and/or provide Internet connectivity, many organizations rely on the infrastructure and facilities of Internet service providers (ISPs) rather than purchase and configure the necessary equipment themselves. In the illustrative embodiment, the computer network 100 is organized into a plurality of domains, including organization domains 160 of private networks coupled to an ISP domain 200. An organization 160 may subscribe to one or more ISPs 200 and couple each of its private networks to the ISP's equipment. FIG. 2 is a schematic block diagram of an ISP domain 200 comprising a plurality of interconnected access and backbone routers 210, 220. The access routers 210 connect the individual organization or subscriber domains 160 to the backbone routers 220 via relatively low-speed ports connected to the subscribers. The backbone routers 220 are interconnected by WAN links 130 to form one or more backbone networks 230 configured to provide high-speed, high-capacity, wide area connectivity to the Internet, represented herein as Internet cloud 250.

Figure 3:
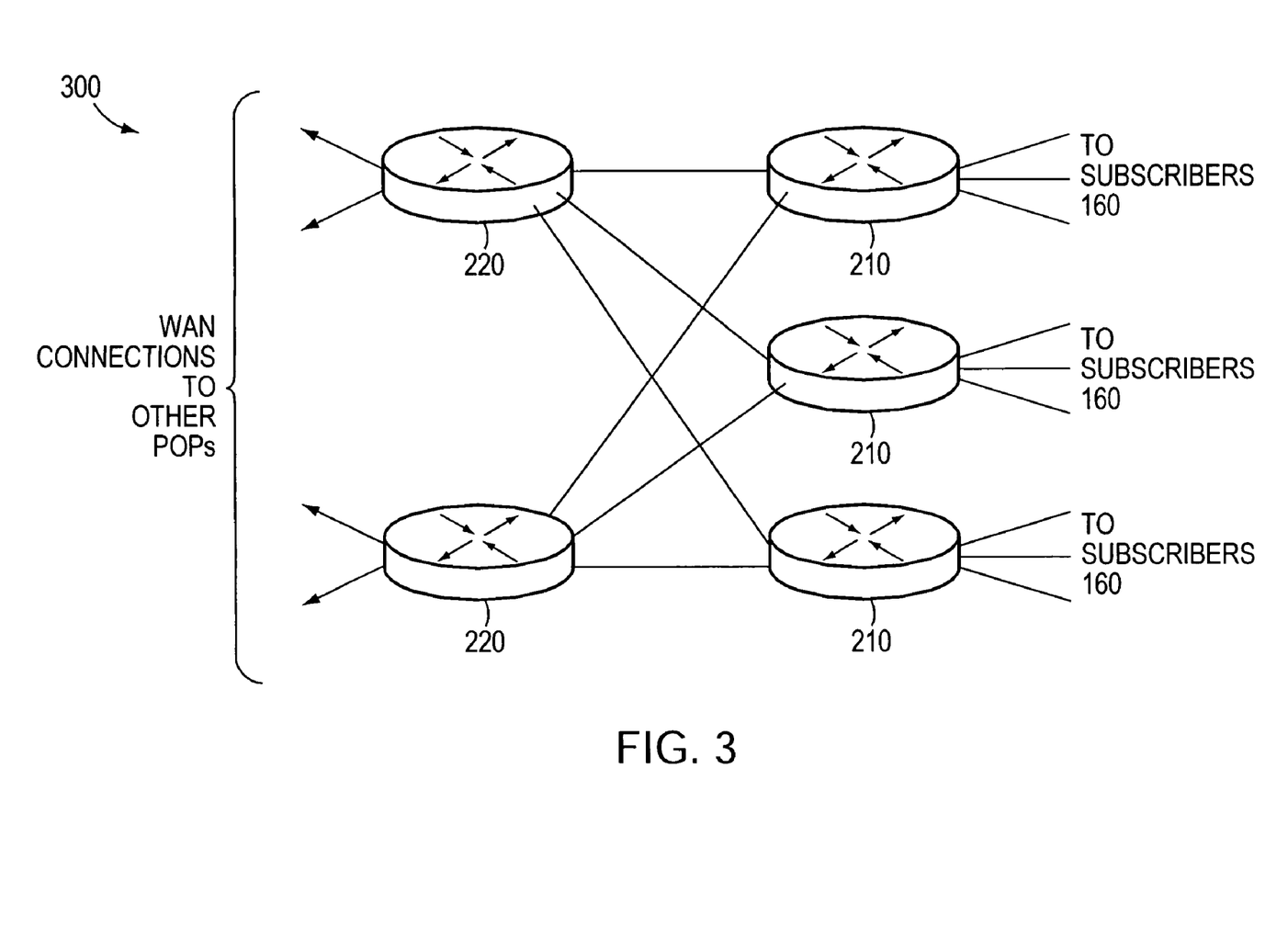
FIG. 3 is a schematic block diagram of an illustrative embodiment of an ISP point of presence (POP) that may be advantageously used with the present invention.

An ISP domain 200 may be further organized into points of presence (POP), each of which comprises a physical location wherein a set of access and backbone routers is located. FIG. 3 is a schematic block diagram of an illustrative embodiment of a POP 300 that may be advantageously used with the present invention. The POP 300 comprises a plurality of backbone routers 220 coupled to access routers 210 equipped with redundant trunk connections. The use of more than one backbone router enhances network availability, as does the use of redundant trunk connections on the access routers. The backbone routers 220 and access routers 210 are maintained separately so that backbone router configuration can be kept relatively stable over time. Backbone routers are not affected when individual subscribers add or remove value-added services or when individual subscribers are added to or removed from the access routers 210. In addition, access routers can be added as new subscribers are brought onto the network.

In general, the access router 210 serves as a "front line" for an ISP 200, connecting directly to routers on the subscribers' premises. However, there is usually a complex circuit-switched infrastructure that transports, e.g., a leased line signal a "last mile" between the subscriber premises and the POP 300. There are many ways of constructing the last-mile network; one technique for new installations is based on metropolitan-area fiber-optic ring technology. These fiber-optic network installations may be based on Synchronous Optical Network (SONET) or Synchronous Digital Hierarchy (SDH) standards. SONET/SDH technology is desirable in transport networks that provide leased line connectivity to subscriber routers because of the high capacity of fiber-optic cables and the high-density, industry-wide standard interface between network transport equipment and the equipment that uses the transported signals, such as aggregation routers.

Figure 4:
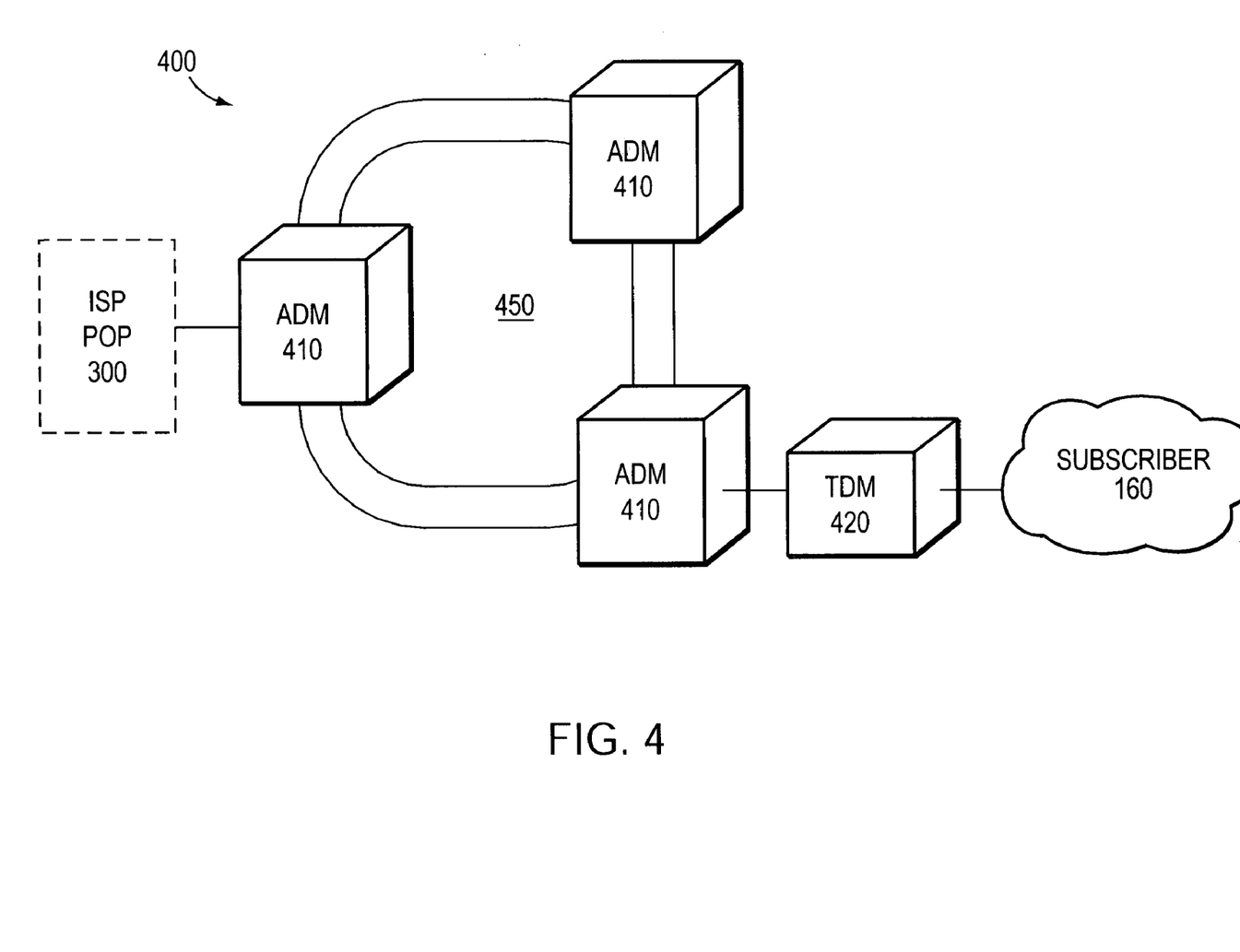
FIG. 4 is a schematic block diagram of a Synchronous Optical Network (SONET) metropolitan-area transport network that may be advantageously used with the present invention.

FIG. 4 is a schematic block diagram of a SONET metropolitan-area transport network 400 that may be advantageously used with the present invention. The SONET network 400 transports 1.544-Mbps DS1 and 44.736-Mbps DS3 signals from a subscriber site 160 across a fiber-optic ring 450 to an ISP POP 300. To that end, the SONET network 400 comprises a TDM device 420 configured to multiplex a plurality of (e.g., 28) DS1 circuits to fill a DS3 circuit. In addition, the network 400 comprises a plurality of add drop multiplexers (ADMs 410) configured to "drop-off" either DS 1 or DS3 circuits onto, e.g., an OC-48 SONET fiber.

As Internet traffic increases, the demand for access routers 210 to handle increased density, and backbone routers 220 to handle greater throughput, becomes more important. Increased density denotes a greater number of subscriber ports that can be terminated on a single access router. An aggregation router is an access router configured to accommodate increased density by aggregating a large number of leased lines from ISP subscribers onto a few trunk lines coupled to an Internet backbone. That is, the aggregator essentially functions as a large "fan-in" device wherein a plurality of relatively low-speed subscriber input links is aggregated onto at least one high-speed output trunk to a backbone network of the Internet.

Figure 5:
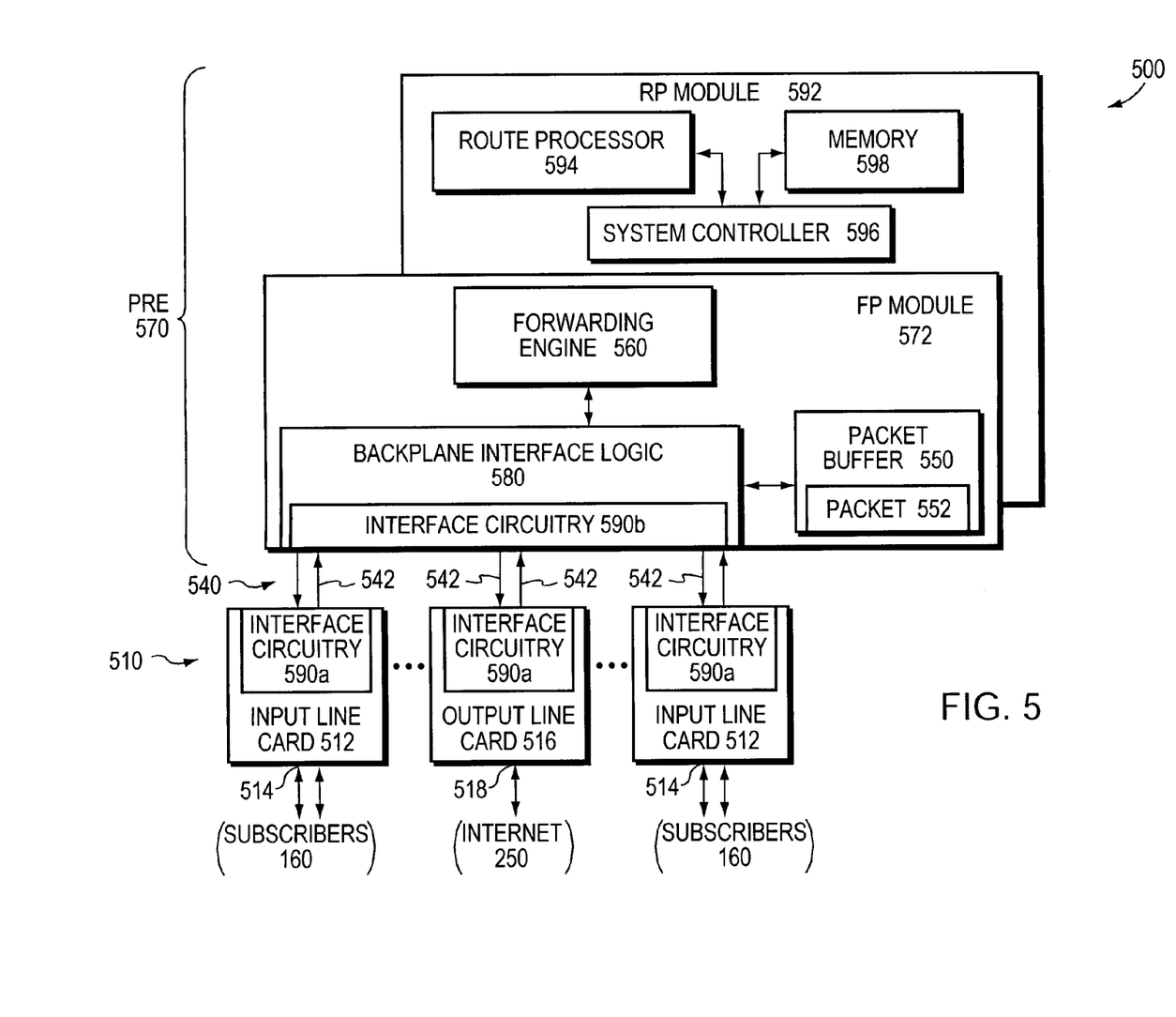
FIG. 5 is a schematic block diagram of an aggregation router having a backplane adapted to receive a plurality of line cards in accordance with the present invention.

FIG. 5 is a schematic block diagram of an aggregation router 500 in accordance with the present invention. The aggregation router ("aggregator") comprises a plurality of line cards 510 coupled to at least one performance routing engine (PRE 570) via a unidirectional (i.e., point-to-point) interconnect system 540. The line cards 510 include a plurality of input cards 512 having input ports 514 coupled to subscribers 160 and at least one output "trunk" card 516 configured to aggregate the subscriber inputs over at least one output port 518. The PRE 570 is an assembly comprising a fast packet "forwarding" processor (FP) module 572 and a route processor (RP) module 592 adapted to perform packet forwarding and routing operations, respectively. The FP and RP modules are preferably interconnected in a "mezzanine" arrangement to form the PRE 570. The PRE assembly also provides quality of service (QoS) functions for complete packets received from each input line card over the interconnect system.

To that end, the interconnect system 540 comprises a plurality of high-speed unidirectional (i.e., point-to-point) links 542 coupling the PRE to each line card 510. The links are preferably clock forwarded links such that each unidirectional link comprises a "narrow" connection of two data "wire pairs" for transporting the data signals and one clock wire pair for carrying clock signals. However, it will be understood to those skilled in the art that the clock forwarding technique may scale to accommodate other clock forwarding arrangements such as, e.g., a "wide" connection comprising four data signals for each accompanying clock signal.

The RP module 592 is a processor-based, routing system suite comprising functionality incorporated within a typical router. That is, the RP module comprises a general-purpose processor 594 (e.g., a MIPS route processor) coupled to a system controller 596 and memory 598. The memory 598 comprises synchronous dynamic random access memory (SDRAM) storage locations addressable by the processor 594 for storing software programs and data structures accessed by the components. A network routing operating system, portions of which are typically resident in memory and executed by the route processor, functionally organizes the router by, inter alia, invoking network operations in support of software processes executing on the router. The route processor 594 is configured to construct and load routing tables used by the FP module 572. The processor 594 also performs configuration management functions of the aggregation router 500 and communicates with neighboring peer routers to exchange protocol data units used to construct the routing tables in accordance with conventional routing algorithms. It will be apparent to those skilled in the art that other memory means, including various computer readable media, may be used for storing and executing program instructions pertaining to the operation of the router.

In the illustrative embodiment, the aggregator 500 includes sixteen (16) line cards 510, each of which is configured for an OC-12, i.e., 622 megabits per second (Mbps), data rate. Thus, the point-to-point links 542 coupled to the line cards must be capable of supporting such data rates. Accordingly, an interconnect protocol is provided that enables encoding of packets over the point-to-point links 542 of the interconnect system to thereby limit the bandwidth consumed by overhead when transmitting the packets within the aggregation router. An example of an interconnect protocol that may be advantageously used with the present invention is disclosed in co-pending and commonly-owned U.S. patent application Ser. No. 09/791,062 titled High Performance Protocol for an Interconnect System of an Intermediate Network Node, which application is hereby incorporated by reference as though fully set forth herein.

Interface circuitry 590 coupled to the ends of the unidirectional links 542 is resident on both the line cards 510 and a backplane logic circuit 580 of the PRE 570. The backplane logic circuit 580 is preferably embodied as a high performance, application specific integrated circuit (ASIC), hereinafter referred to as the Cobalt ASIC, which is configured to further interface the line cards to a packet buffer 550 and a forwarding engine 560 of the FP module 572. The packet buffer 550 is a memory used to store packets 552 as the forwarding engine 560 determines where and when they should be forwarded within the aggregator. For example, the packet buffer may be used to store low priority data packets while high priority, low latency voice packets are forwarded by the forwarding engine to an output card (e.g., the trunk card 516) of the aggregator. An example of a backplane logic circuit that may be advantageously used with the present invention is disclosed in co-pending and commonly-owned U.S. patent application Ser. No. 09/791,063 titled High Performance Interface Logic Architecture of an Intermediate Network Node, which application is hereby incorporated by reference as though fully set forth herein.

The interface circuitry 590 includes interconnect ports coupled to the point-to-point links 542 of the interconnect system 540 and implements a unidirectional, point-to-point clock forwarding technique that is configured for direct ASIC-to-ASIC transmission over a backplane of the aggregation router. As a result, the interface circuitry 590a resident on the line cards 510 is preferably embodied within a high-performance ASIC, hereinafter referred to as the Barium ASIC, whereas the interface circuitry 590b is resident on the Cobalt ASIC. The interface circuitry generally functions as a translator that converts conventional formats of data received at the line cards 510 to a novel protocol format for transmission from, e.g., the Barium ASIC over the interconnect system 540 to the Cobalt ASIC. The ASICs also include circuitry to perform cyclic redundancy code (CRC) generation and checking on packets, along with interconnect format checking.

Broadly stated, the backplane of the aggregator supports independent "half-slot" line cards, each capable of delivering up to OC-12 bandwidth using a narrow connection (e.g., each of the two data signals per half slot operating at 400 Mb/s). Alternatively, a pair of backplane connectors may be attached to one "full-slot" line card. A full slot card may connect just one of the connectors to its interface circuitry, in which case it is functionally identical to a half-slot card, or may use both in "bound" mode for double bandwidth.

Figure 6:
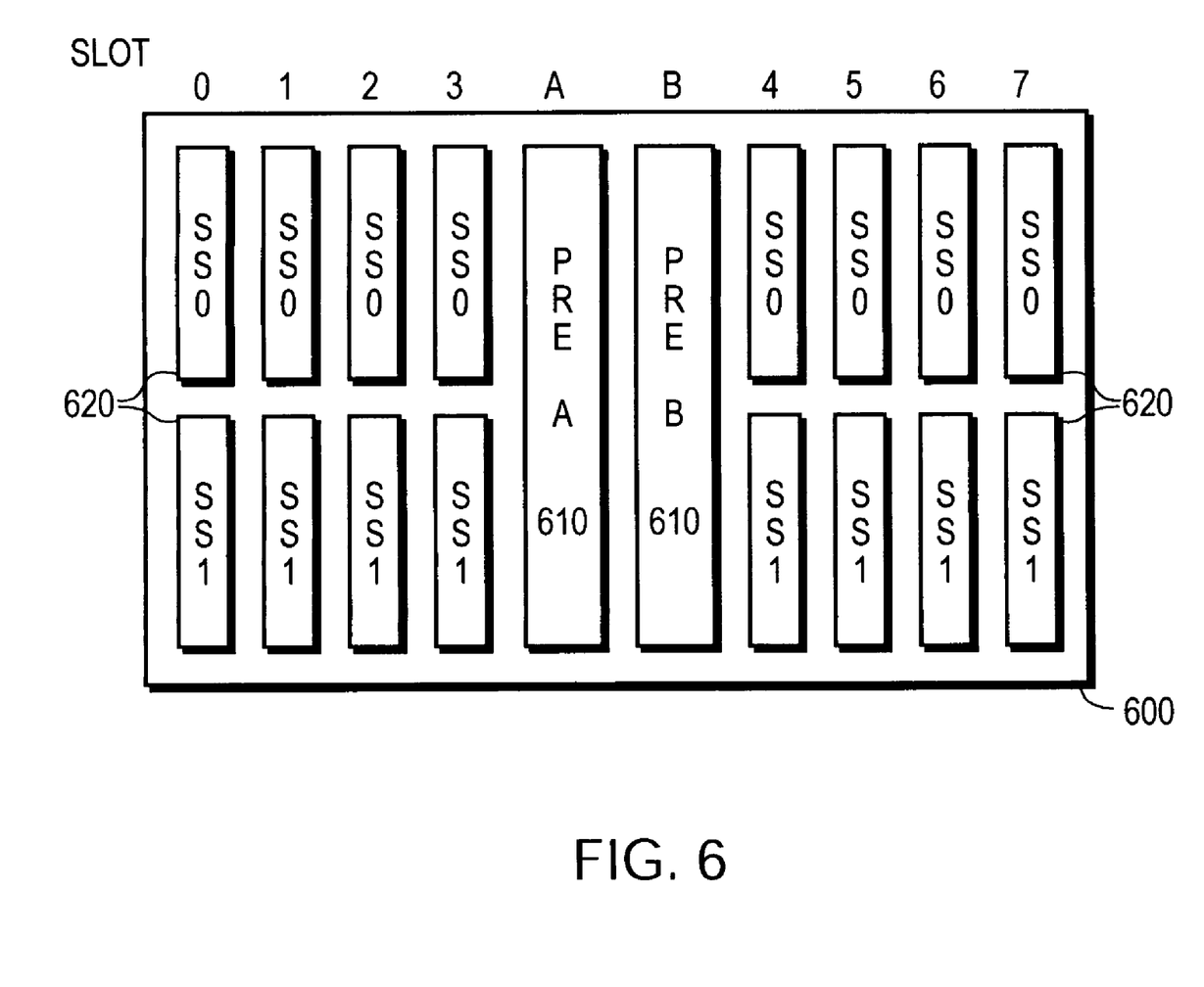
FIG. 6 is a schematic block diagram of an illustrative embodiment of the backplane of the present invention.

FIG. 6 is a schematic block diagram of an illustrative embodiment of the backplane 600 of the aggregation router 500. The backplane 600 includes two central, full slots 610, each having a connector configured to accommodate (receive) a PRE module assembly. In particular, these central slot connectors are used to accommodate redundant PRE assemblies PRE-A and PRE-B. The backplane is organized such that there are eight (8) adjacent slots (four on each side of the redundant central PRE slots) with each adjacent slot having two (2) subslots (SS0, SS1). Thus, the backplane illustratively comprises sixteen (16) half slots 620, each of which includes a connector configured to accommodate a half-slot height (i.e., half-height) line card. In addition to supporting half-height line cards, the backplane 600 may support full-slot height (i.e., full-height) line cards that span both subslots of a slot and that may include either one or two connectors adapted for insertion into the connectors of the subslots of the slot.

In the illustrative embodiment, all line cards are full-height line cards for a total of 8 line cards in the aggregation router. However, in an alternate embodiment, the backplane 600 can further support 16 half-height cards or any mixture of full-height and half-height cards. Each half-slot connector 620 of the backplane can support OC-12 line cards whose bandwidths conform to a trunk interface card 516 of the aggregator. Notably, the trunk card can be inserted into any of the symmetrical half-slots on the backplane; that is, there is no dedicated slot for the trunk line card 516 in the router platform. Advantageously, the platform can support a variety of subscriber line cards, each having different data bandwidth and formats, such as T1, T3, OC-3 and/or SDH1 (the European equivalent of OC-3).

Redundancy techniques are used to protect against failures directed to an input and/or output interface of the aggregator or to the link connection (such as a fiber optic cable) coupled to the aggregator. Failures to one or more of these components typically require human intervention to replace the failed component and then reconfigure the router for proper operation. Such human intervention is inefficient and costly, and the present invention is directed to a technique for automatically (i.e., without human intervention) reconfiguring an aggregator upon detection of a failure to a component of the router or its links.

Figure 7:
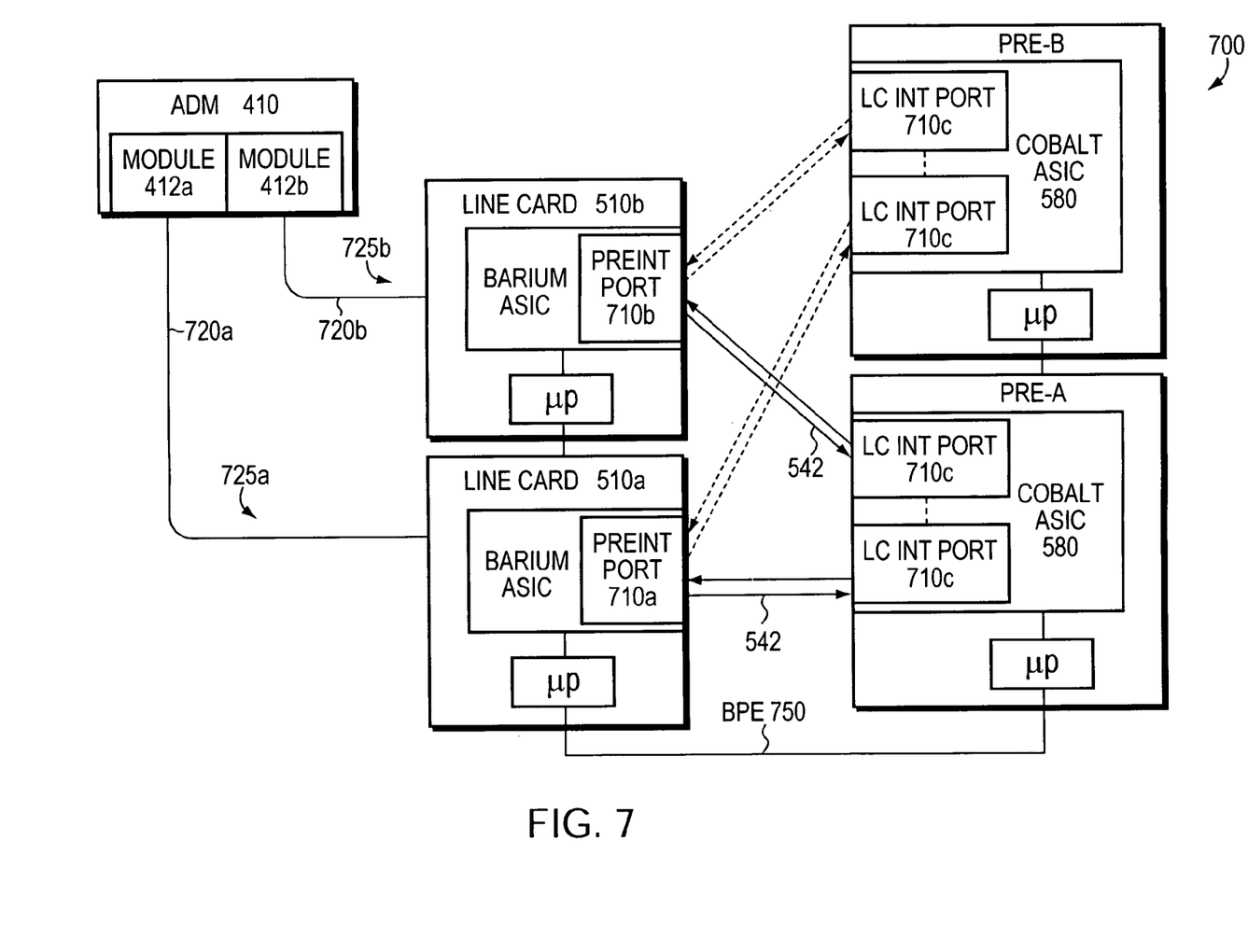
FIG. 7 is a schematic block diagram of an illustrative embodiment of an automatic protection switching (APS) line card redundancy technique in accordance with the present invention.

The present invention comprises an apparatus and technique for configuring the aggregator to implement automatic protection switching (APS) among its line cards 510 in the event of a failure to one of the line cards. The APS line card redundancy technique enables redundancy among a pair of line cards connected to a PRE assembly of the router. FIG. 7 is a schematic block diagram of an embodiment 700 of the APS line card redundancy technique wherein two line cards 510a,b are connected to redundant PRE assemblies, PRE-A and PRE-B, over unidirectional links 542. The aggregator may include two PRE assemblies inserted into slots 610 of backplane 600 and arranged in redundant fashion so that one assembly may operate in the presence of a failure to the other assembly. PRE redundancy is provided by electing one of the assemblies as the primary PRE and designating the other assembly as the secondary PRE. The primary PRE is configured to forward all traffic through the aggregator until it fails, at which time the secondary PRE takes over operation.

Each line card 510a,b includes a PRE interface port (PRE Int Port) 710a,b residing on the Barium ASIC that is coupled to one of a plurality of line card interface ports (LC Int Port) 710c on a respective Cobalt ASIC of PRE-A and PRE-B over link 542a,b. The PRE Int and LC Int Ports comprises transceiver circuitry needed to interface with the unidirectional links. A microprocessor coupled to the Barium ASIC on each line card and a microprocessor coupled to the Cobalt ASIC on each PRE cooperate to configure their ASICs and the interconnect system 540 for APS line card redundancy communication. The microprocessors preferably communicate over a backplane Ethernet (BPE) medium 750 that is shared by the PRE assemblies and line cards. Magnetic coupling is used to link the transceivers to the BPE 750 to reduce the chances that a single failure can cause an aggregation routing system failure.

When the line cards are inserted into the backplane, they communicate with the PREs over the BPE 750 in accordance with a "capabilities" exchange that identifies the types of line cards and their various characteristics/parameters. One parameter exchanged between the line cards and the PRE is identification of a redundancy mode of operation. When the aggregator is initially powered, PRE-A and PRE-B negotiate for primary status over the BPE 750. Assertion of a primary signal causes the line cards 510a,b to switch their PRE Int Ports 710a,b to the selected primary PRE. The primary PRE "boots" the aggregator, initializes the line cards, establishes routing relationships and initiates forwarding traffic. The secondary PRE completes its self-test and performs partial operating system initialization exclusive of reading its configuration file. The two PRE assemblies then exchange conventional negotiation messages over dedicated wires in the backplane. The exchanged messages are preferably messages defined by the Enhanced High System Availability (EHSA) negotiation algorithm available from Cisco Systems, Inc. If the secondary PRE determines that the primary PRE has failed, it initiates a "cutover" operation causing the line cards to shift their port circuitry to the new primary PRE. The secondary PRE then reads its configuration file and rebuilds its routing relationships with the neighboring routers.

Prior to a failure situation, the secondary PRE monitors the status of the primary PRE and receives copies of updated configuration information to be applied to its stored configuration file. The line cards contain circuitry for "looping" packets back onto the secondary PRE over the point-to-point links. This allows the secondary PRE to send and receive test packets to evaluate its own operation in addition to the operation of the BPE and line card secondary paths before they are needed when a failure occurs. Hardware support is provided in the backplane 600 to accommodate the redundant PREs. Most links on the backplane are point-to-point signals with separate connections between a line card and each of the redundant PRE assemblies. There are also a few "bussed" signals that are coupled to the line cards and both PRE assemblies.

In addition to PRE redundancy, the aggregator may be configured for APS redundancy of the line cards to accommodate failures to either the line cards or the transmission facility carrying trunk traffic to upstream equipment. SONET APS is defined by Telcordia GR-253-CORE and ANSI T1.105.01. APS supports fast recovery from fiber or equipment failures in a SONET network. In the illustrative embodiment, the novel APS line card redundancy technique is preferably used in SONET networking environment 400 in connection with ADMs 410 (FIG. 4). Here, each of a pair of redundant line cards 510 (preferably configured as SONET/SDH type line cards) is coupled to a single ADM 410 via separate fiber (e.g., OC-12) connections 720a,b.

The ADM 410 typically includes two modules 412a,b adapted to couple to the fiber connections 720a,b. The ADM transmits identical data over external data paths 725a,b including these connections 720a,b when communicating with the line cards; nevertheless, it selects one data path for primary communication with the aggregator 500. In this context, each external data path 725 extends from a module 412 of the ADM 410 over the fiber connection 720 to a line card 510 within the aggregator. If a failure arises in, e.g., primary external data path 725a, the ADM executes a cutover operation to resume communication over the secondary external data path 725b. The present invention is directed to an APS line card redundancy technique that is implemented by the aggregator 500 to accommodate this type of SONET APS environment.

As noted, SONET APS requires that the ADM 410 send the same packet over both external data paths 725a, b to the redundant line cards 510a,b and that the ADM select one of the external data paths over which it will receive information from the aggregator. In essence, the ADM selects the external data path 725 that it believes to be operational. In the illustrative embodiment of the present invention, this basic structure and approach is emulated within the backplane interface logic 580 (Cobalt ASIC) on each PRE 570. That is, the interface logic 580 is configured to receive information from one of the redundant line cards 510a,b having an internal data path that it believes is operational while transmitting information over both internal data paths to both redundant line cards.

One of the functions of the route processor 594 of the PRE is to monitor the health of the aggregator, including the "goodness" of the internal data paths coupled to the redundant line cards. To that end, the route processor 594 initiates selection of an active internal data path among the pair of redundant line cards 510a,b. The route processor renders this selection without intervention of the line cards such that both line cards operate as if they are always active. This simplifies configuration of the redundant line cards, while also increasing the efficiency of the selection process by enabling the route processor and Cobalt ASIC to make the determination.

Upon reception of data from a line card, the Cobalt ASIC generates a context, which is passed to the forwarding engine 560 of the PRE 570. The context includes packet data along with an indication of the source of the data (i.e., the appropriate slot/subslot of the backplane 600) and a channel number associated with the source. This information is used by the forwarding engine to distinguish among the various types and data rates of the line cards, particularly for implementing QoS features of the aggregator. The channel number is an identifier unique to a single packet flow of a line card; notably, the channel numbers are stored in forwarding tables utilized by the forwarding engine 560 and constructed on a per line card basis.

Consequently, when the route processor 594 changes the source of the context in accordance with a cutover operation associated with the APS line card redundancy technique, the forwarding engine "perceives" that the data associated with the context originally sourced from, e.g., slot 1 is now sourced from slot 2. As a result, the forwarding engine 560 would typically "tear down" the forwarding tables associated with slot 1 and rebuild those tables for slot 2. This process consumes a significant amount of time and router resources, and is therefore quite inefficient. The present invention is directed to a technique that improves the efficiency of the cutover process used with the APS line card redundancy technique. In particular, the invention comprises a novel logic circuit configured to provide an alias function that enhances the operation of the APS line card redundancy technique. The alias logic circuit essentially functions to assign a predetermined slot number value to a context that is sourced from either one of a redundant pair of line cards. In the illustrative embodiment, the predetermined slot number value is preferably the "odd" slot number of the redundant pair.

For example, assume that a redundant pair of line cards is inserted into slots 1 and 2 of the backplane 600. The route processor 594 initially selects the data path associated with slot 1 as the primary internal data path for receiving data from the redundant pair. If the route processor subsequently detects a failure with that path, it performs a cutover operation and reconfigures the Cobalt ASIC to receive the context data from the secondary internal data path associated with slot 2. The alias function is then invoked to ensure that the slot number associated with the context provided to the forwarding engine is designated as the odd slot number of that redundant pair (e.g., slot 1). Accordingly, the forwarding engine 560 perceives the context data as being sourced from a single line card despite the cutover operation associated with the detection of a failure and the process of rebuilding the forwarding tables is obviated.

This enhanced feature of the APS line card redundancy technique is possible because the ADM 410 of the SONET APS network 400 transmits identical copies of a packet over both fiber connections 720a,b to both of the redundant line cards 510a,b on the aggregator. Since the ADM is sending similar traffic to each line card, the forwarding tables originally constructed by the forwarding engine are correct even in light of a cutover operation that results from a failure of one of the redundant data paths. Essentially, the alias function "hides" the cutover operation from the forwarding engine. That is, the novel alias logic circuit operates transparently to the forwarding engine in a manner that enables high performance, low packet loss and minimal intervention from the route processor.

Figure 8:
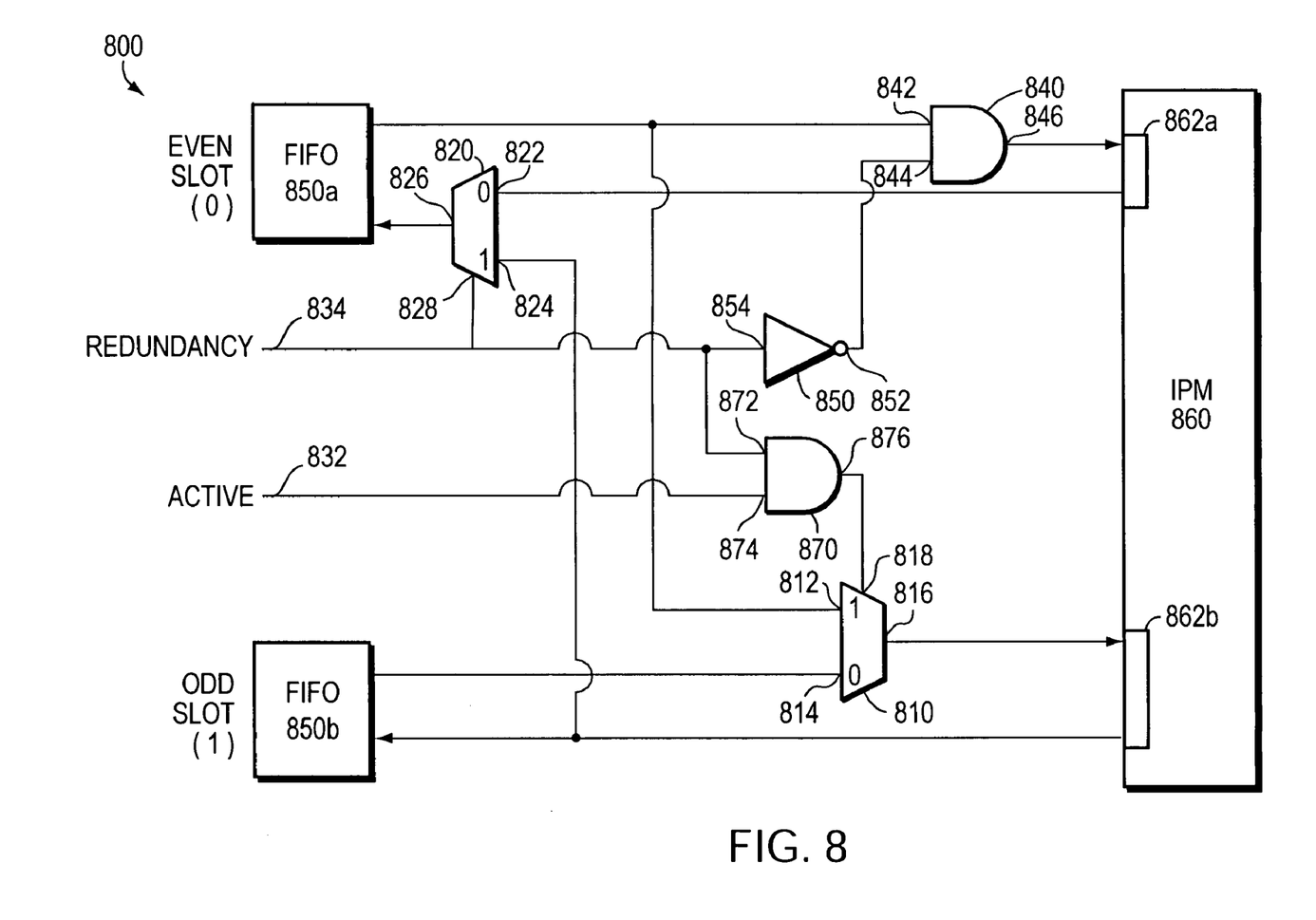
FIG. 8 is a schematic block diagram of an alias logic circuit in accordance with the present invention.

FIG. 8 is a schematic block diagram of the alias logic circuit 800 of the present invention. Broadly stated, when the route processor 594 asserts a sense of line card redundancy to the Cobalt ASIC, the alias logic circuit 800 is invoked. The circuit 800 is preferably contained within receiver circuitry of the Cobalt ASIC 580 at the outputs of first-in, first-out (FIFO) queues 850a,b associated with even/odd slot clock domains of the aggregator. The FIFO queues define a boundary between a receive clock domain of a slot and a "chip core" clock domain of the Cobalt ASIC. The alias logic circuit 800 comprises combinatorial logic including a plurality of multiplexers, each coupled between a FIFO associated with a particular clock domain and an internal packet memory (IPM 860) of the Cobalt ASIC.

Data retrieved from the FIFOs is typically provided directly to the IPM 860. This data includes packet data along with an interconnect header of the packet and the slot number of the source of the data. The IPM has a separate port for each line card inserted into a slot of the backplane 600. In the illustrative embodiment, the IPM has eight (or sixteen) ports 862, each associated with a slot (or subslot) of the backplane and configured to receive a stream of packets from a line card 510. The stream of packets is queued by the IPM and then forwarded to the forwarding engine 560 for processing in accordance with forwarding decisions and QoS features.

In the illustrative embodiment, the IPM has a hardwired slot number associated with each input port 862. Since the forwarding decisions and QoS functions rendered by the forwarding engine using its forwarding table are performed on a per slot basis, the IPM associates a slot number with each of the data streams received from the FIFOs 850 and organizes those streams on a slot number basis. Moreover, the alias logic circuit 800 is associated with each pairing of redundant line cards; that is, there is an alias circuit associated with each pair of even/odd slots, e.g., slots 0 and 1, slots 2 and 3, etc.

Specifically a first multiplexer 810 has a first input 812 coupled to the internal data path associated with an even numbered slot clock domain and a second input 814 coupled to the internal data path associated with an odd numbered slot clock domain. An output 816 of the first multiplexer 810 is coupled to a hardwired slot number port 862*b* of the IPM 860 corresponding to the odd numbered slot clock domain. A second multiplexer 820 has a first input 822 coupled to the hardwired slot number port 862*a* of the IPM corresponding the even numbered slot clock domain and a second input 824 coupled to the hardwired slot number port 862*b* of the IPM 860 corresponding to the odd numbered slot clock domain. An output 826 of second multiplexer 820 is coupled to the internal data path associated with the even numbered slot clock domain.

The route processor 594 provides active and redundancy control signals 832, 834 to the multiplexers and other control logic of the alias circuit 800 through its configuration information acquired within the aggregator. The states of these signals allow the route processor to switch between the internal data paths of the redundant line cards. To that end, the control logic includes a first AND gate 840 having a first input 842 coupled to the data path associated with an even numbered slot clock domain and a second input 844 coupled to an output 852 of an inverter 850 whose input 854 is the redundancy signal 834. An output 846 of the first AND gate 840 is coupled to the hardwired slot number port 862*a* of the IPM 860 corresponding the even numbered slot clock domain. The control logic further includes a second AND gate 870 having a first input 872 coupled to the redundancy signal 834 and a second input 874 coupled to the active signal 832. An output 876 of the second AND gate 870 is coupled to a selector input 818 of the first multiplexer 810 and is used to select one of the inputs of that multiplexer. The redundancy signal 834 is coupled to a selector input 828 of the second multiplexer and is used to select one of the inputs of that multiplexer.

During normal, non-APS system operation when the line cards are functioning properly, the redundancy signal is not asserted by the route processor 594. This enables the first multiplexer 810 to select data from its second input 814 coupled to the internal data path associated with the odd numbered slot clock domain. Meanwhile, the second multiplexer 820 is enabled to select data from its first input 822 coupled to the hardwired slot number port 862*a* of the IPM corresponding the even numbered slot clock domain. Furthermore, the first AND gate 840 is configured to pass data at its first input 842 coupled to the data path associated with the even numbered slot clock domain. In other words, the even and odd slots are independent.

During APS line card redundancy operation, the redundancy signal is asserted by the route processor 594 and the active signal selects the active slot. For example, when the active signal is not asserted, e.g., "0", the first multiplexer 810 is enabled to select data from its second input 814 coupled to the internal data path associated with the odd numbered slot clock domain. However, when the active signal is asserted, e.g., "1", the first multiplexer 810 is enabled to select data from its first input 812 coupled to the internal data path associated with the even numbered slot clock domain. In either case, the second multiplexer 820 is enabled to select data from its second input 824 coupled to the hardwired slot number port 862*b* of the IPM 860 corresponding to the odd numbered slot clock domain. Furthermore, the first AND gate 840 is configured to not pass data at its first input 842 coupled to the data path associated with an even numbered slot clock domain.

While there has been shown and described an illustrative embodiment for configuring an aggregator to implement APS redundancy among line cards of the router in the event of a failure to one of the line cards, it is to be understood that various other adaptations and modifications may be made within the spirit and scope of the invention. For example in another embodiment, there are three modes for APS line card redundancy configuration: full slot APS, bound mode APS and half slot APS. In the full slot APS mode, two adjacent full sized line cards are organized as a redundant pair. The adjacent slots include an even numbered slot and the neighboring slot with a higher number (e.g., slots 0 and 1 or 2 and 3) may be combined. The bound mode APS involves two bound cards and the ability to select between these bound cards for redundancy purposes. The half slot APS mode combines top and bottom subslots to form one redundant interface as seen by the router. Multiplexers may be arranged and configured to send the same packet data to both the top and bottom subslots and to select one of the two subslots to use for receive data. The individual half slot cards may be replace independently to allow a broken optical interface or line card to be replaced with out disrupting traffic on the other card of the pair.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A system adapted to configure an intermediate network node to implement redundancy among a pair of line cards of the node in the event of a failure to one of the line cards, the system comprising;
   a performance routing engine (PRE) of the node;
   data paths internal to the node, the internal data paths coupling the pair of line cards to the PRE; and
   an alias logic circuit configured to select data from one of the pair of line cards to the PRE, each line card of the pair of line cards having a different assigned slot number, the alias logic circuit selecting a first one of the different assigned slot numbers and associating the first slot number with data from both line cards of the pair of line cards, and the alias logic circuit further configured to send identical copies of data over the internal data paths to the pair of line cards.

2. The system of claim 1 wherein
the alias logic circuit further comprises control logic and a plurality of multiplexers coupled between buffers associated with clock domains and a memory of the node, the multiplexers and control logic coupled to active and redundancy control signals provided by a route processor of the PRE, the control signals enabling the route processor to switch between the internal data paths coupled to the line cards.

3. The system of claim 2 wherein the buffers are queues and wherein the memory is an internal packet memory of a backplane interface logic circuit in the node.

4. The system of claim 3 wherein the queues are first-in, first-out queues.

5. The system of claim 1 wherein the intermediate network node is an aggregation router.

6. A system adapted to configure an intermediate network node to implement redundancy among a pair of line cards of the node in the event of a failure to one of the line cards, the system comprising:
a performance routing engine (PRE) of the node;
data paths internal to the node, the internal data paths coupling the pair of line cards to the PRE;
an alias logic circuit configured to select data from one of the pair of line cards to the PRE and further configured to send identical copies of data over the internal data paths to the pair of line cards, the alias logic circuit having control logic and a plurality of multiplexers coupled between buffers associated with clock domains and a memory of the node;
a first multiplexer having a first input coupled to a first internal data path associated with an even numbered slot clock domain and a second input coup ed to a second internal data path associated with an odd numbered slot clock domain, the first multiplexer further having an output coupled to a second hardwired slot number port of a memory corresponding to the odd numbered slot clock domain; and
a second multiplexer having a first input coupled to a first hardwired slot number port of the memory corresponding to the even numbered slot clock domain and a second input coupled to the second hardwired slot number port of the memory corresponding to the odd numbered slot clock domain, the second multiplexer further having an output coupled to the first internal data path associated with the even numbered slot clock domain.

7. The system of claim 6 wherein the alias logic circuit further comprises:
a first logic gate having a first input coupled to the first internal data path associated with the even numbered slot clock domain, the first logic gate further having an output coupled to the first hardwired slot number port of the memory corresponding the even numbered slot clock domain;
an inverter having an input coupled to a redundancy signal provided by a route processor of the PRE, the redundancy signal further coupled to a selector input of the second multiplexer for selecting one of the inputs of the second multiplexer, the inverter further having an output coupled to a second input of the first logic gate; and
a second logic gate having a first input coupled to the redundancy signal and a second input coupled to an active signal provided by the route processor, the second logic gate further having an output coupled to a selector input of the first multiplexer, the selector input configured to select one of the inputs of the first multiplexer.

8. The system of claim 7 wherein the memory is an internal packet memory of a backplane interface logic circuit in the node.

9. The system of claim 8 wherein the intermediate network node is a router.

10. A method for configuring a router to implement redundancy among a pair of line cards of the router in the event of a failure to one of the line cards, the method comprising the steps of:
providing a performance routing engine (PRE) of the router;
coupling the pair of line cards to the PRE by way of data paths internal to the router;
selecting data from one of the pair of line cards for transmission to the PRE using an alias logic circuit, each line card of the pair of line cards having a different assigned slot number, the alias logic circuit selecting a first one of the different assigned slot numbers and associating the first slot number with data from both line cards of the pair of line cards; and
sending identical copies of data over the internal data paths to the pair of line cards.

11. The method of claim 10 wherein the first slot number is a predetermined slot number value, and the first slot number is associated with a context that is sourced from one of the pair of line cards.

12. The method of claim 11 wherein the first slot number is an odd slot number of the line card pair.

13. A method for configuring a router to implement redundancy among a pair of line cards of the router in the event of a failure to one of the line cards, the method comprising the steps of:
providing a performance routing engine (PRE) of the router;
coupling the pair of line cards to the PRE by way of data paths internal to the router;
selecting data from one of the pair of line cards for transmission to the PRE using an alias logic circuit;
sending identical copies of data over the internal data paths to the pair of line cards;
providing a backplane of the router, the backplane having a plurality of slots, each slot comprising top and bottom subslots such that each slot is configured to accommodate one of a full-size line card and two half-sized line cards;
binding two adjacent full-sized line cards into a redundant pair in accordance with a first redundancy mode; and
combining a top subslot and a bottom subslot of a backplane slot to form one redundant interface in accordance with a second redundancy mode.

14. The method of claim 13 wherein the first redundancy mode is a full slot automatic protection switching (APS) mode and the second redundancy mode is a half slot APS mode.

15. Apparatus for configuring an intermediate network node to implement redundancy among a pair of line cards of the node in the event of a failure to one of the line cards, the apparatus comprising:
means for coupling the pair of line cards to a performance routing engine (PRE) of the node;
means for selecting data from one of the pair of line cards for transmission to the PRE, each line card of the pair of line cards having a different assigned slot number, the alias logic circuit selecting a first one of the different assigned slot numbers and associating the first slot number with data from both line cards of the pair of line cards; and means for sending identical copies of data over the means for coupling to the pair of line cards.

16. The apparatus of claim 15 wherein the means for coupling comprises data paths internal to the node.

17. The apparatus of claim 15 further comprising means for assigning the first slot number to a context that is sourced from one of the pair of line cards.

18. Apparatus for configuring an intermediate network node to implement redundancy among a pair of line cards of the node in the event of a failure to one of the line cards, the intermediate network node including a backplane having a plurality of slots, each slot having top and bottom subslots such that each slot is configured to accommodate one of a full-size line card and two half-sized line cards, the apparatus comprising:

means for coupling the pair of line cards to a performance routing engine (PRE) of the node;

means for selecting data from one of the pair of line cards for transmission to the PRE;

means for sending identical copies of data over the means for coupling to the pair of line cards;

means for binding two adjacent full-sized line cards into a redundant pair; and means for combining a top subslot and a bottom subslot of a backplane slot to form one redundant interface of the node.

19. A computer readable medium containing executable program instructions for configuring an aggregation router to implement redundancy among a pair of line cards of the router in the event of a failure to one of the line cards, the executable program instructions comprising program instructions for:

coupling the pair of line cards to a performance routing engine (PRE) of the router by way of data paths internal to the router;

selecting data from one of the pair of line cards for transmission to the PRE using an alias logic circuit, each line card of the pair of line cards having a different assigned slot number, the alias logic circuit selecting a first one of the different assigned slot numbers and associating the first slot number with data from both line cards of the pair of line cards; and sending identical copies of data over the internal data paths to the pair of line cards.

20. The computer readable medium of claim 19 further comprising program instructions for assigning the first slot number to a context that is sourced from one of the pair of line cards.

21. A computer readable medium containing executable program instructions for configuring a router to implement redundancy among a pair of line cards of the router in the event of a failure to one of the line cards, the router includes a backplane having a plurality of slots, each slot comprising top and bottom subslots such that each slot is configured to accommodate one of a full-size line card and two half-sized line cards, the executable program instructions comprising program instructions for:

coupling the pair of line cards to a performance routing engine (PRE) of the router by way of data paths internal to the router;

selecting data from one of the pair of line cards for transmission to the PRE using an alias logic circuit;

sending identical copies of data over the internal data paths to the pair of line cards;

binding two adjacent full-sized line cards into a redundant pair in accordance with a first redundancy mode; and combining a top subslot and a bottom subslot of a backplane slot to form one redundant interface in accordance with a second redundancy mode.

22. A system for operating a network node, the system comprising:

a forwarding engine of the network node; and an alias logic circuit configured to select data from either a first or a second line card of the pair of line cards, the alias logic circuit associating a first slot number value with the data from the first and the second line cards, whereby the forwarding engine perceives the data from either the first or the second line card to be sourced from the first line card.

23. The system of claim 22, wherein the alias logic circuit associates the first slot number value with a context that is sourced from either one of the pair of line cards.

24. The system of claim 22, wherein the first slot number value is an odd slot number of the pair of line cards.

25. A method for operating a network node, the method comprising the steps of:

providing a forwarding engine of the network node; and selecting data from either a first or a second line card of the pair of line cards;

associating a first slot number value with the data from the first and the second line cards, whereby the forwarding engine perceives the data from either the first or the second line card to be sourced from the first line card.

26. The method of claim 25, wherein the step of associating a first slot number value with data further comprises:

associating the first slot number value with a context that is sourced from either one of the pair of line cards.

27. The method of claim 26, wherein the first slot number value is an odd slot number of the pair of line cards.

28. The method of claim 26, further comprising the step of:

providing data paths internal to the network node, the data paths coupling the pair of line cards to the forwarding engine; and sending identical copies of data on the data paths to the forwarding engine.

29. A computer readable medium containing executable program instructions for execution on a processor, the executable program instructions comprising program instructions for:

selecting data from either a first or a second line card of the pair of line cards;

associated a first slot number value with the data from the first and the second line cards, whereby a forwarding engine perceives the data from either the first or the second line card to be sourced from the first line card.

30. A system for implementing redundancy in a network node, the system comprising:

a forwarding engine of the network node;

a first line card associated with a first slot number;

a second line card associated with a second slot number; and an alias logic circuit configured to receive data from the first and the second line cards of the redundant pair, the alias logic circuit fiber configured to associate data from the first line card with the first slot number and data from the second line card with the first slot number, such that the forwarding engine will perceive the data from either the first or the second line card as sourced from the first line card.

31. The system of claim 30 wherein data comprises a plurality of data packets.

32. The system of claim 31 wherein the alias logic circuit is further configured to generate a context for each data packet, the context including packet data and an indicator of a particular slot number.

33. The system of claim 32 wherein the alias logic circuit is further configured to include the first slot number in the context of all packets regardless of their actual source.

34. The system of claim 30 further comprising:
a first multiplexer having a first input coupled to a first internal data path associated with an even numbered slot clock domain and a second input coup led to a second internal data path associated with an odd numbered slot clock domain, the first multiplexer further having an output coupled to a second hardwired slot number port of a memory corresponding to the odd numbered slot clock domain; and
a second multiplexer having a first input coupled to a first hardwired slot number part of the memory corresponding to the even numbered slot clock domain and a second input coupled to the second hardwired slot number port of the memory corresponding to the odd numbered slot clock domain, the second multiplexer further having an output coupled to the first internal data path associated with the even numbered slot clock domain.

35. The system of claim 30 further comprising:
a forwarding table used by the forwarding engine, the forwarding table associated with the first line card, the forwarding engine configured to use the forwarding table with data from the second line card in response the first slot number being associated with data from the second line card.

36. The system of claim 30 wherein the first slot number and the second slot number are associated with the first line card and the second line card based upon the physical location of the line cards on a back plane of the network node.

37. The system of claim 30 wherein the network node is an aggregation router.

38. A method for implementing redundancy in a network node, the method comprising the steps of:
providing a forwarding engine of the network node;
associating a first line card with a first slot number;
associating a second line card with a second slot number;
associating data from the first line card with the first slot number; and
associating data from the second line card with the first slot number, such that the forwarding engine will perceive the data from either the first or the second line card as sourced from the first line card.

39. The method of claim 38 wherein data comprises a plurality of data packets.

40. The method of claim 39 further comprising the step of:
generating a context for each data packet, the context including packet data and an indicator of a particular slot number.

41. The method of claim 40 further comprising the step of:
including the first slot number in the context of all packets regardless of their actual source.

42. The method of claim 38 further comprising the steps of:
providing a forwarding table used by the forwarding engine, the forwarding table associated with the first line card; and
configuring the forwarding engine to use the forwarding table with data from the second line card, in response the first slot number being associated with data from the second line card.

43. The method of claim 38 wherein the first slot number and the second slot number are associated with the first line card and the second line card based upon the physical location of the line cards on a back plane of the network node.

44. A system for implementing redundancy in a network node, the system comprising:
means for associating a first line card with a first slot number;
means for associating a second line card with a second slot number,
means for associating data from the first line card with the first slot number; and
means for associating data from the second line card with the first slot number,
such that a forwarding engine will perceive the data from either the first or the second line card as sourced from the first line card.

45. A computer readable medium containing executable program instructions for implementing redundancy in a network node, the executable program instructions comprising program instructions for:
associating a first line card with a first slot number;
associating a second line card with a second slot number,
associating data from the first line card with the first slot number; and
associating data from the second line card with the first slot number, such that a forwarding engine will perceive the data from either the first or the second line card as sourced from the first line card.

* * * * *